(12) United States Patent
Frushour

(10) Patent No.: US 7,070,635 B2
(45) Date of Patent: Jul. 4, 2006

(54) SELF SHARPENING POLYCRYSTALLINE DIAMOND COMPACT WITH HIGH IMPACT RESISTANCE

(75) Inventor: Robert H. Frushour, Ann Arbor, MI (US)

(73) Assignee: Diamond Innovations, Inc., Worthington, OH (US)

( * ) Notice: Subject to any disclaimer, the term of this patent is extended or adjusted under 35 U.S.C. 154(b) by 6 days.

(21) Appl. No.: 10/950,122

(22) Filed: Sep. 24, 2004

(65) Prior Publication Data

US 2005/0051366 A1   Mar. 10, 2005

Related U.S. Application Data

(62) Division of application No. 10/183,098, filed on Jun. 25, 2002, now Pat. No. 6,852,414.

(51) Int. Cl.
*B32B 7/00* (2006.01)

(52) U.S. Cl. .............. 51/309; 51/293; 51/295; 51/297; 51/307; 75/243

(58) Field of Classification Search .................. 51/293, 51/295, 297, 307, 309; 75/243
See application file for complete search history.

(56) References Cited

U.S. PATENT DOCUMENTS

| | | | |
|---|---|---|---|
| 4,311,490 A | 1/1982 | Bovenkerk et al. | |
| 4,604,106 A | 8/1986 | Hall | |
| 4,636,253 A * | 1/1987 | Nakai et al. | 75/243 |
| 4,784,023 A | 11/1988 | Dennis | |
| 5,011,514 A * | 4/1991 | Cho et al. | 51/295 |
| 5,011,515 A * | 4/1991 | Frushour | 51/307 |
| 5,011,616 A | 4/1991 | Marshall et al. | |
| 5,096,465 A * | 3/1992 | Chen et al. | 51/295 |
| 5,151,107 A * | 9/1992 | Cho et al. | 51/295 |
| 5,351,772 A | 10/1994 | Smith | |
| 5,355,969 A | 10/1994 | Hardy et al. | |
| 5,379,854 A | 1/1995 | Dennis | |
| 5,564,511 A * | 10/1996 | Frushour | 51/293 |
| 5,645,617 A | 7/1997 | Frushour | |
| 5,645,619 A * | 7/1997 | Erickson et al. | 51/309 |
| 5,766,394 A * | 6/1998 | Anderson et al. | 51/297 |
| 5,855,996 A | 1/1999 | Corrigan et al. | |
| 6,187,068 B1 | 2/2001 | Frushour et al. | |

* cited by examiner

*Primary Examiner*—Archene Turner
(74) *Attorney, Agent, or Firm*—Pepper Hamilton LLP

(57) ABSTRACT

A polycrystalline diamond compact for use in cutting operations with a renewable sharp cutting edge, high abrasion resistance and high impact strength. The polycrystalline diamond is a composite composed of a matrix of coarse diamond interspersed with large agglomerated particles of ultra fine diamond. The agglomerated particles produce sharp cutting edges that are protected from impact forces by the overall uniform matrix of coarse diamond crystals. The self-sharpening cutter is highly resistant to spalling and catastrophic fracture.

18 Claims, 5 Drawing Sheets

SELF SHARPENING POLYCRYSTALLINE DIAMOND COMPACT WITH HIGH IMPACT RESISTANCE

CROSS REFERENCE TO RELATED APPLICATIONS

This is a divisional application claiming the benefit of and priority to U.S. patent application Ser. No. 10/183,098, filed on Jun. 25, 2002 now U.S. Pat. No. 6,852,414, which is herein incorporated by reference.

BACKGROUND OF THE INVENTION

1. Field of the Invention

The present invention relates to a sintered polycrystalline diamond composite for use in rock drilling, machining of wear resistant metals, and other operations which require the high abrasion resistance or wear resistance of a diamond surface. Specifically, this invention relates to polycrystalline diamond which has been sintered at high temperatures- and high pressure with the aid of a catalyst to form strong diamond to diamond bonding.

2. Description of the Art

Composite polycrystalline diamond compacts or PCD have been used for industrial applications including rock drilling and metal machining for many years. One of the factors limiting the success of the PCD is the generation of heat due to friction between the PCD and the work material. This heat causes thermal damage to the PCD in the form of cracks which lead to spalling of the polycrystalline diamond layer, delamination between the polycrystalline diamond and substrate, and back conversion of the diamond to graphite causing rapid abrasive wear.

When the PCD cutter is new, it generally has a circular geometry, and it thus presents a sharp cutting edge to the work material. However, after use for some time, this circular or arc-shaped cutting edge wears into a straight flat surface that cannot as effectively penetrate the work material. When used for rock drilling, the worn PCD cutter acts as a friction bearing surface that generates heat, which accelerates the wear of the PCD cutter and slows the penetration rate of the drill. FIG. 1 shows a wear flat generated on a prior art cutter at location 1.

Prior art methods to solve this problem, such as discussed in U.S. Pat. No. 4,784,023 to Dennis, utilize a substrate with a non-planar surface so that the interface between the diamond and the substrate is irregular. The result is a diamond layer which has both thin and thick sections. The thicker portion of the polycrystalline diamond offers more abrasion resistance and wears at a slower rate. Failure analysis of drill bits containing PCDs with non-planar interfaces shows that the worn cutting edges of the cutters are irregular and sharper than those of cutters made with planar interfaces. Although this has generally been shown to be an improvement, there is still an area of concern. When non-planar substrates are used, highly localized stress occurs at the interface, causing cracking which can result in catastrophic failure of the cutter.

In U.S. Pat. No. 4,784,023, the disadvantage of using relatively few parallel grooves with planar side walls is that the stress becomes concentrated along the top and, more importantly, the base of each groove and results in significant cracking of the metallic substrate along the edges of the bottom of the groove. This cracking significantly weakens the substrate whose main purpose is to provide mechanical strength to the thin polycrystalline diamond layer. As a result, construction of a polycrystalline diamond cutter following the teachings provided by U.S. Pat. No. 4,784,023 is not suitable for cutting applications where repeated high impact forces are encountered, such as in percussive drilling; nor is it suitable in applications where extreme thermal shock is a consideration. FIG. 2 shows a prior art cutter of this design and the location of cracking at edges 3.

Other configurations have been proposed in order to overcome problems of stress in the compact due to the mismatch in thermal expansion between the diamond layer and the tungsten carbide substrate. For example, U.S. Pat. No. 5,351,772 describes the use of radially extending raised lands on one side of the tungsten carbide substrate area on which a polycrystalline diamond table is formed and bonded.

U.S. Pat. No. 5,011,616 describes a substrate with a surface topography formed by irregularities having non-planar side walls, such that the concentration of substrate material continuously and gradually decreases at deeper penetrations into the diamond layer. U.S. Pat. No. 5,379,854 describes a substrate with a hemispherical interface between the diamond layer and the substrate, the hemispherical interface containing ridges that penetrate into the diamond layer. U.S. Pat. No. 5,355,969 describes an interface between the substrate and polycrystalline layer defined by a surface topography with radially-spaced-apart protuberances and depressions.

All of the above proposals show a diamond layer of varying thickness relative to the surface of the tungsten carbide substrate support. Thus, in areas where the diamond layer is thicker, the amount of cobalt available is less than in those areas where the diamond layer is thin. This results in a non-uniformly sintered diamond layer that substantially weakens the compact. Even when cobalt powder is pre-mixed with the diamond prior to subjecting the compact to high pressure-high temperature conditions, the presence of cobalt in a substrate with a textured surface produces areas of varying concentration of cobalt within the diamond layer during the sintering process and causes soft spots or poorly sintered areas within the diamond layer.

It has been proposed to use transitional layers to better sinter the diamond and improve the adhesion of the polycrystalline diamond to the substrate.

One of the solutions to these problems is proposed in U.S. Pat. No. 4,604,106. This PCD utilizes one or more transitional layers incorporating powdered mixtures with various percentages of diamond, tungsten, carbide, and cobalt to distribute the stress caused by the difference in thermal expansion over a larger area. A problem with this solution is that the cobalt cemented carbide in the mixture weakens that portion of the diamond layer because less diamond-to-diamond direct bonding occurs as a result of the carbide second phase.

U.S. Pat. No. 4,311,490 teaches the use of coarse diamond particles next to the tungsten support with a layer of finer diamond particles placed on top as the exposed cutting surface. This is reported to reduce the occurrence of soft spots or poorly sintered areas in the diamond table since the coarser particles have larger channels between them, making it easier for cobalt to sweep through the diamond nearest the tungsten carbide substrate, thus allowing thicker diamond layers to be sintered. For rock drilling applications, however, it has been found that although finer diamond results in higher abrasion resistance, it also results in significantly less impact resistance. The lower impact resistance produces compact cutter failure by way of fracturing and spalling of the diamond layer from the tungsten carbide support substrate.

U.S. Pat. No. 5,645,617 also uses layers of diamond with different average particle sizes.

The problem with the layer designs is that they do not provide a means to cause irregular wear of the cutting edge and thus do not eliminate the problem of formations of a relatively large wear flat. Thus, it would be useful to have a means to control the geometry of the cutting edge and at the same time limit the stress caused by using non-planar interfaces.

U.S. Pat. No. 5,855,996 shows a polycrystalline diamond compact which incorporates different sized diamond. Specifically, it describes mixing submicron sized diamond particles together with larger sized diamond particles in order to create a more densely packed compact by filling the interstices between the larger diamond with diamond particles of smaller size. The problem with this approach is that the uniformly dense diamond PCD produces a uniformly flat, dull working surface at the cutting interface. The dull edge thus created as the PCD wears slows the penetration rate in rock drilling applications, creates heat, and cracks once initiated proceed unhindered across the entire PCD layer.

U.S. Pat. No. 6,187,068 B1 teaches the separation of diamond into laterally spaced regions of discrete particle size areas. The polycrystalline diamond areas formed of the finer size diamond particles provide a higher abrasion resistance and a slower wear rate, thus providing a non-linear cutting edge. The problem with this solution is that the areas of different diamond size are relatively large in size and do not provide a sharp enough cutting edge as wear progresses. Thus, although offering an improvement over other geometries, heat is still generated at the working surface. Additionally, the large geometric patterns of differing particle sizes produce stress along the boundaries between the discrete particle size areas leading to catastrophic fracture of the polycrystalline material. FIG. 3 shows a cross section of a prior art cutter of this design. Cracking occurs at the edge boundaries 4 and 5 between the different geographic areas.

SUMMARY OF THE INVENTION

The instant invention is to uniformly distribute an aggregate of fine diamond particles throughout a matrix of larger sized diamond particles. The aggregates are sized to perform as single large grains of very high abrasion resistance distributed in a matrix constructed of somewhat smaller diamond single crystals.

The overall composite polycrystalline diamond performs as a blend of various size diamond crystals sintered together wherein the largest granules are actually blocky shaped structures composed of fine diamond single crystals. Thus, there are no continuous edge boundaries along large geometric shaped areas of discrete particle sizes. The result is that much sharper cutting edges form as the polycrystalline material wears, and long fracture lines do not occur along boundaries between the different geographic areas. Impact failure occurs by chipping rather than spalling of large areas or catastrophic cracking.

BRIEF DESCRIPTION OF THE DRAWING

The various features, advantages, and other uses of the present invention will become more apparent by referring to the following detailed description and drawing, in which.

DETAILED DESCRIPTION

In the following description, it should be understood that the composite described hereafter as formed of polycrystalline diamond, PCD, or sintered diamond as the material is often referred to in the art, can also be any of the super hard abrasive materials, including, but not limited to, synthetic or natural diamond, cubic boron nitride, and wurzite boron nitride, as well as combinations thereof.

Figure 1:
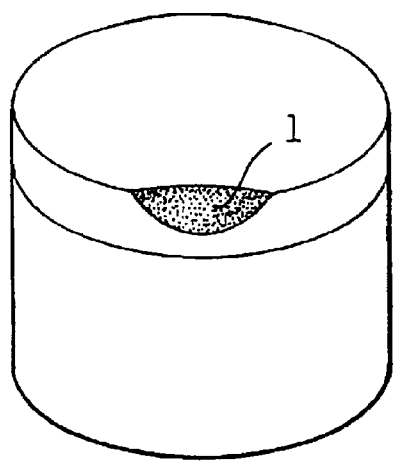
FIG. 1 is a perspective view of one prior art polycrystalline diamond compact.
Figure 2:
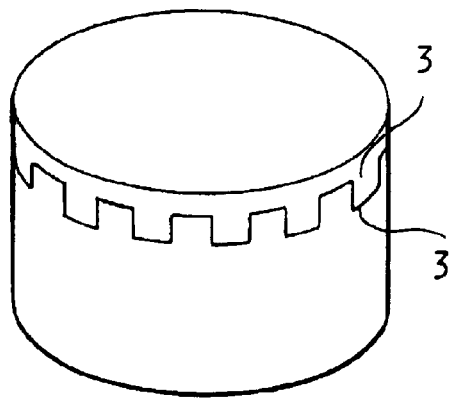
FIG. 2 is a perspective view of a second prior art polycrystalline diamond compact.
Figure 3:
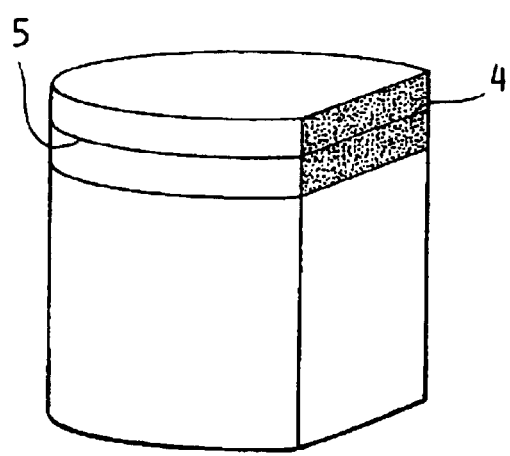
FIG. 3 is a perspective view of a prior art polycrystalline diamond compact with discrete particle size areas.
Figure 4:
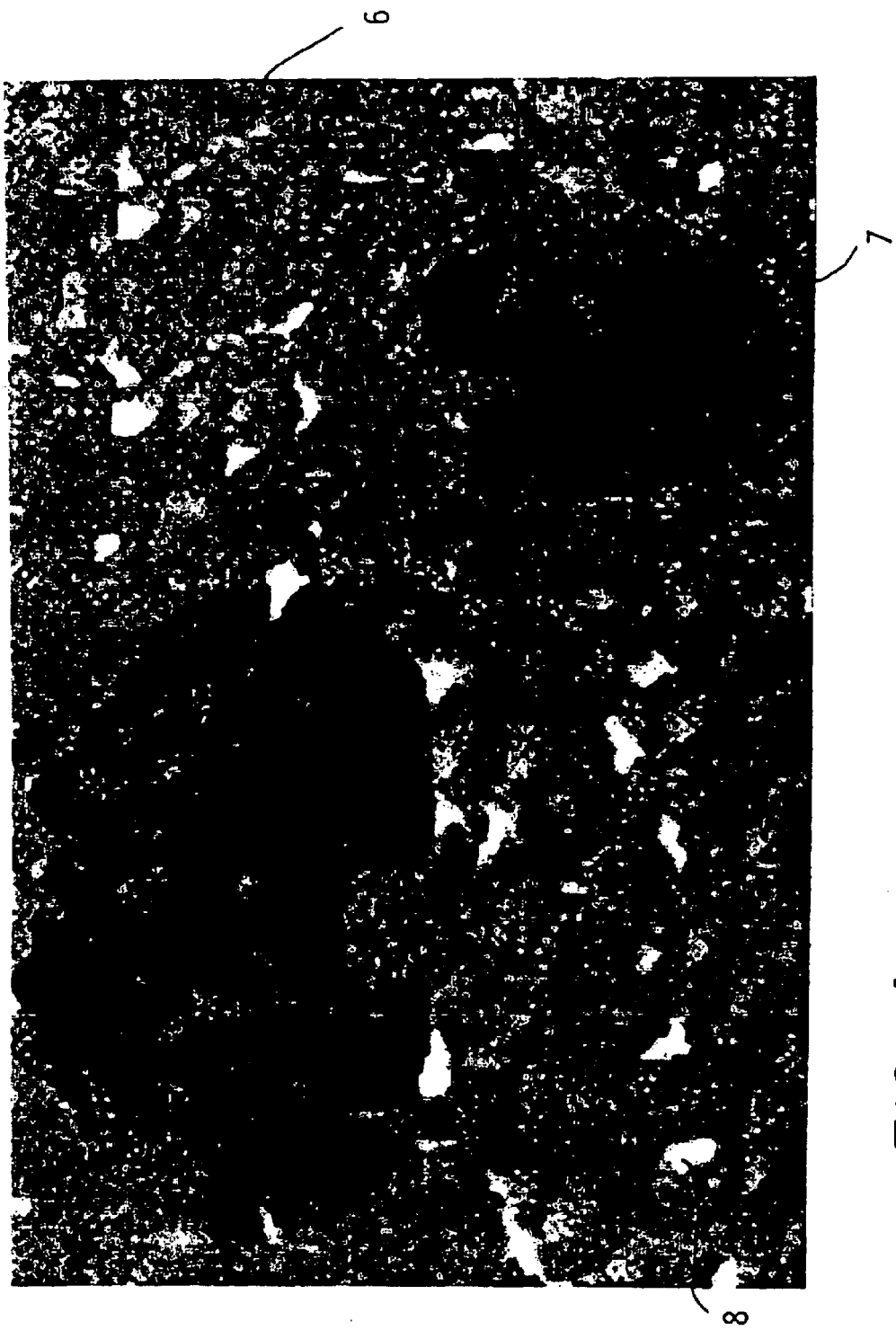
FIG. 4 is shows an enlarged cross sectional view of one embodiment of this invention.

FIG. 4 shows an enlarged cross sectional view of one embodiment of this invention which includes a polycrystalline diamond matrix 6 with aggregates 7 composed of ultra fine diamond particles. The matrix is made up of an aggregate of fine diamond particles distributed throughout a matrix of larger diamond wherein the matrix is made up of particles whose average diameter is at least five times larger than the diamond component of the aggregate. The interstices 8 between the diamond crystals in the matrix are filled with catalyst material or can be void if the catalyst is removed by acid leaching or other methods.

Figure 5:
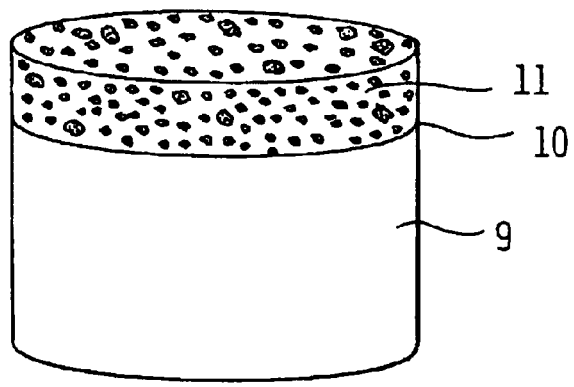
FIG. 5 shows a second embodiment of this invention supported by a substrate.

FIG. 5 shows a second embodiment of this invention. In this embodiment, the polycrystalline composite is a layer supported by a substrate 9 to form a compact or cutting element.

The substrate 9 is preferably formed of a hard metal. In a specific example, the substrate 9 is formed of a metal carbide selected from the group consisting of a tungsten carbide, titanium carbide, tantalum carbide, and mixtures thereof. The substrate 9 may also be formed of a carbide from the group of IVB, VB, or VIB metals which is pressed and sintered in the presence of a binder of cobalt, nickel, iron, and alloys thereof.

Figure 6:
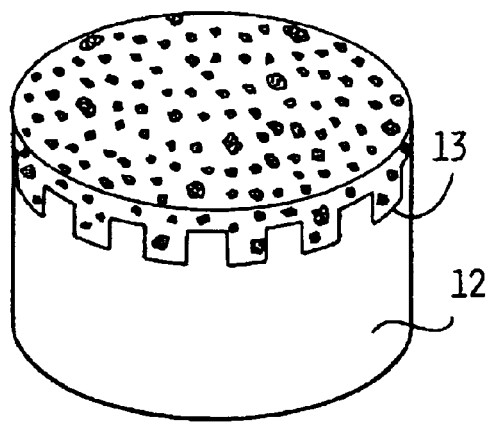
FIG. 6 shows a third embodiment of this invention supported by a substrate with a non-planar interface.

In FIG. 5, the interface 10 between the polycrystalline diamond area 11 and the substrate 9 has a planar or flat configuration. In a third embodiment depicted in FIG. 6, the substrate 12 is formed with a plurality of equally spaced, generally parallel grooves to form the diamond/carbide interface 13. The grooves may be straight sided or formed with angled side walls which are disposed at acute or oblique angles with respect to the plane of substrate 12. Other nonflat surface irregularities may also be employed at the interface 13. Interfaces with any of the other surface topographies known in the art may also be employed.

Figure 7:
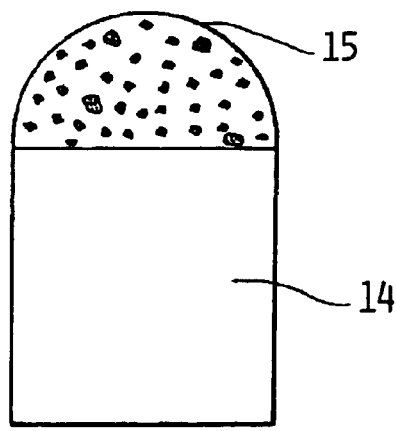
FIG. 7 shows a fourth embodiment of this invention formed over a substrate with a curved surface.

FIG. 7 shows a fourth embodiment of this invention. In this embodiment, the polycrystalline composite is formed over a substrate 14 with a curved surface 15.

Figure 8:
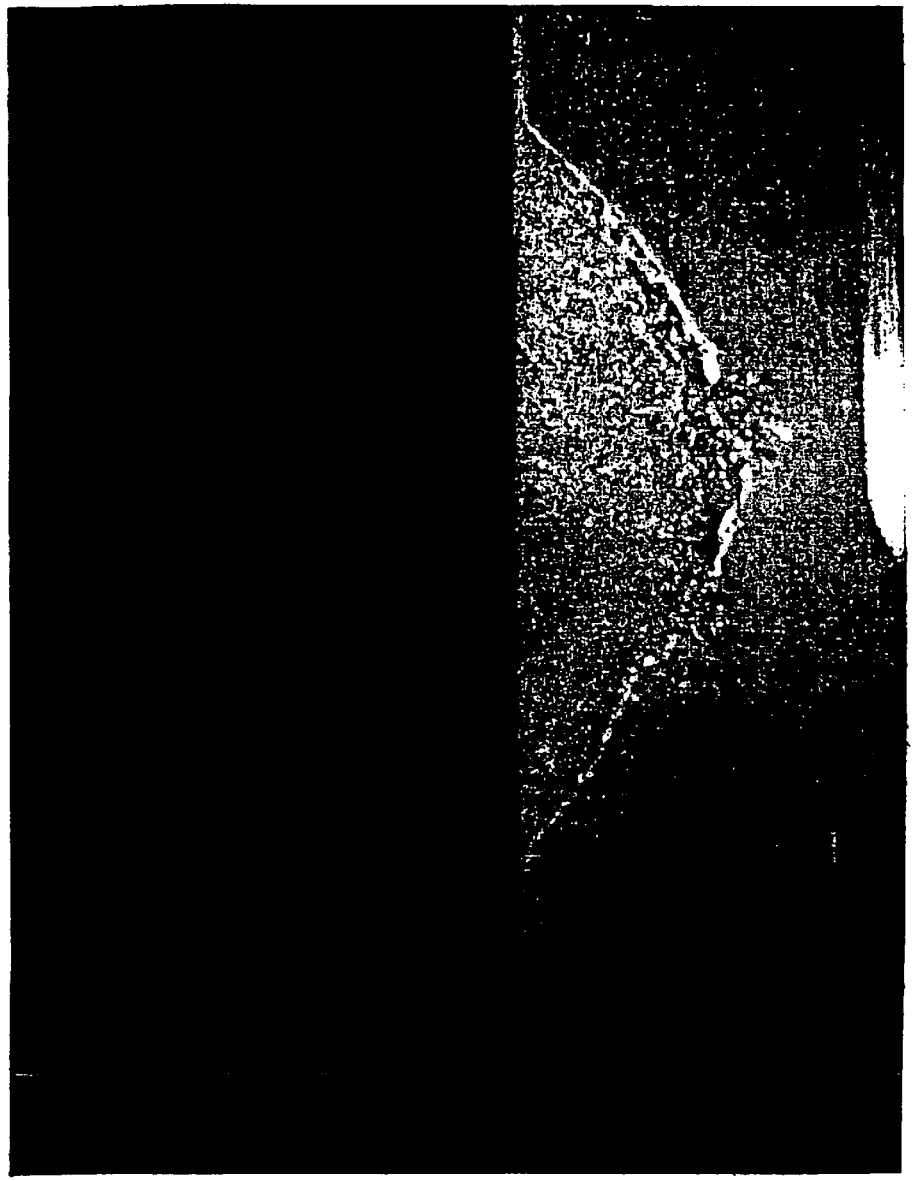
FIG. 8 shows an enlarged photograph of a prior art wear flat.
Figure 9:
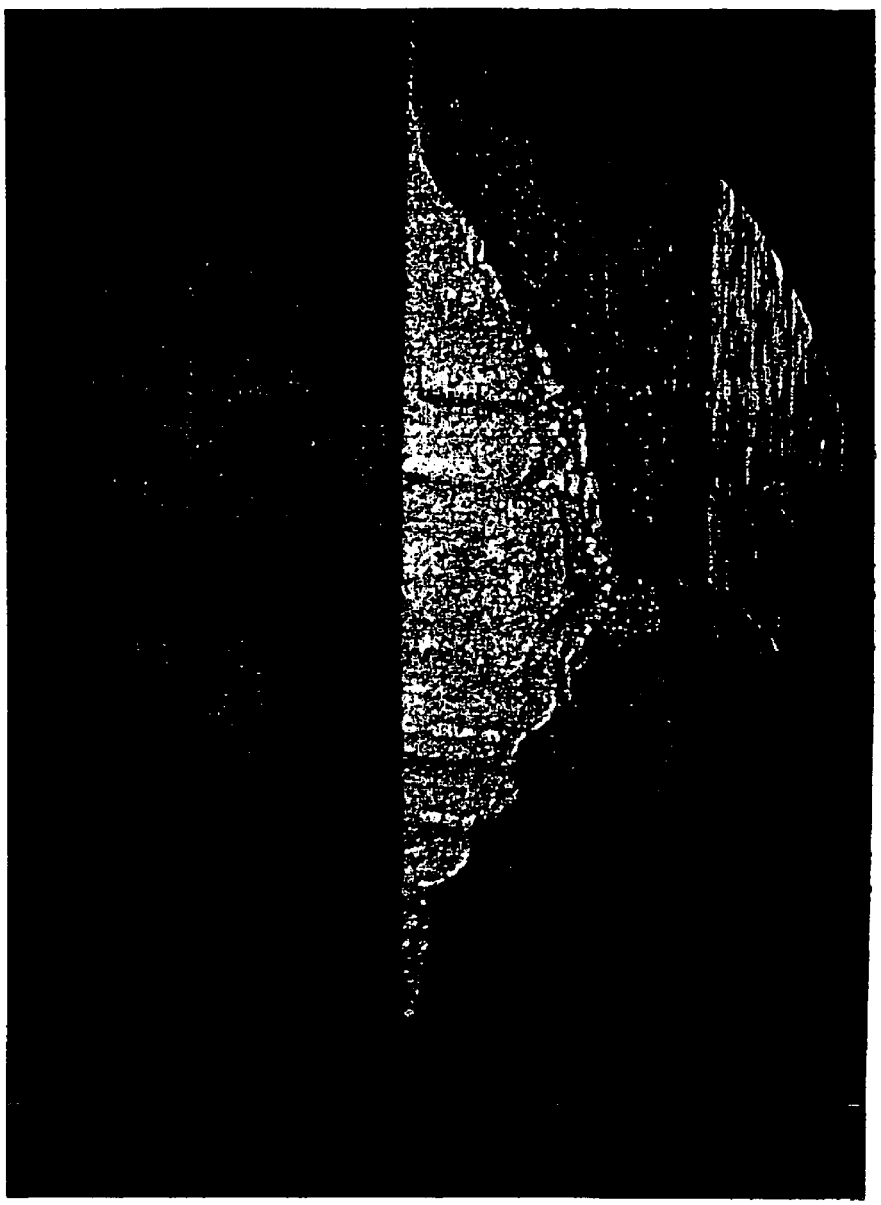
FIG. 9 shows an enlarged photograph of a wear surface generated by the cutter illustrated in FIG. 5.

FIG. 8 shows an enlarged photograph of a wear flat generated by a prior art PDC cutter. FIG. 9 shows an enlarged photograph of the sharp wear surface generated by a PDC cutter made according to this invention.

EXAMPLE #1

A 1 gram sample of 0.4 micron diamond powder was processed and sieved to obtain blocky agglomerated grains between 250 microns and 600 microns in size. A 100 milligram sample of the sieved blocky grains was then mixed with 400 milligrams of 25 micron diamond powder. The diamond mixture was then placed into a molybdenum cup. Finally, a cobalt cemented tungsten carbide substrate was placed into the cup on top of the diamond powder. This assembly was then loaded into a high pressure cell and pressed to 45 K-bars for fifteen minutes at 1450° C. After cutting the power to the cell and allowing the cell to cool at high pressure for one minute, the pressure was released. The composite bodies were removed from the other cell components and then lapped and ground to final dimension.

The abrasion resistance of this cutter was measured after machining Barre granite. This valve was in excess of 2 times the abrasion resistance of a standard PDC. Additionally, the noise and vibration of the machining operation was significantly reduced over that of a standard PDC.

EXAMPLE #2

A 1 gram sample of 0.4 micron diamond powder was processed and sieved to obtain blocky agglomerated grains between 250 microns and 600 microns in size. A 100 milligram sample of the sieved blocky grains was then mixed with 400 milligrams of a blend of diamond ranging in size from 2 microns to 30 microns. The average particle size of the blend was about 20 microns. The diamond mixture was then placed into a molybdenum cup. Finally, a cobalt cemented tungsten carbide substrate was placed into the cup on top of the diamond powder. This assembly was then loaded into a high pressure cell and pressed to 45 K-bars for fifteen minutes at 1450° C. After cutting the power to the cell and allowing the cell to cool at high pressure for one minute, the pressure was released. The composite bodies were removed from the other cell components and then lapped and ground to final dimension.

The impact resistance of this cutter was compared to that of a standard PDC. The breakage of this cutter was through small chipping of the PDC diamond layer at point of impact verses spalling of larger areas of PDC diamond on the standard PDC cutter.

What is claimed is:

1. A cutting element comprising: a polycrystalline diamond layer fixed to a substrate at an interface, wherein the polycrystalline diamond layer comprises:
    fine diamond particles distributed in aggregate form throughout a matrix of larger diamond particles, wherein the matrix comprises particles whose average diameter is at least five times larger than the diameter of the fine particles.

2. The cutting element of claim 1, wherein a catalyst used to sinter the composite has been removed from the composite.

3. The cutting element of claim 1, wherein a catalyst used to sinter the composite has been rendered in-operative.

4. The cutting element of claim 1, wherein the fine diamond particles distributed in aggregate form comprise diamond powder with an average particle size less than 1 micron, and the matrix diamond has an averaage particle size less than 30 microns.

5. The cutting element of claim 1, wherein the aggregate forms of the fine diamond particles have an average diameter that is larger than 100 microns.

6. The cutting element of claim 5, wherein the average diameter of the aggregates forms is between 250 microns and 500 microns.

7. The cutting element of claim 1, wherein the substrate comprises a hard metal.

8. The cutting element of claim 1, wherein the substrate comprises a metal carbide selected from the group consisting of ungsten carbide, titanium carbide, tantalum carbide, and mixtures thereof.

9. The cutting element of claim 1, wherein the substrate comprises at least one carbide formed of at least metal of group IV, V, VB or VIB.

10. The cutting element of claim 9, wherein the carbide is pressed and sintered in the presence of a binder of at least one cobalt, nickel, iron, and alloys thereof.

11. The cutting element of claim 1, wherein the interface has a planar configuration.

12. The cutting element of claim 1, wherein the interface comprises a plurality of spaced, substantially parallel grooves in at least one of the substrate and the polycrystalline diamond.

13. The cutting element of claim 12, wherein the grooves comprise spaced sidewalls extending from a bottom wall.

14. The cutting element of claim 13, wherein the sidewalls are disposed at a non-perpendicular angle with respect to the bottom wall.

15. A cutting element comprising:
    a polycrystalline diamond layer; and
    a substrate;
    wherein the polycrystalline diamond layer comprises a plurality of aggregate bodies distributed throughout a matrix of diamond particles;
    wherein the aggregate bodies comprise fine diamond particles, and the diamond particles in the matrix have an average diameter that is at least five times larger than the diameter of the fine particles.

16. The cutting element of claim 15, wherein polycrystalline diamond layer and the substrate are joined at an interface comprising a plurality of spaced grooves.

17. The cutting element of claim 15, wherein polycrystalline diamond layer and the substrate are joined at an interface having a planar configuration.

18. The cutting element of claim 15, wherein the fine diamond particles have and average particle size less than 1 micron, and the matrix diamond has an average particle size less than 30 microns.

* * * * *